(No Model.)
H. G. CHATAIN.
CAR FENDER.
No. 522,149.      Patented June 26, 1894.
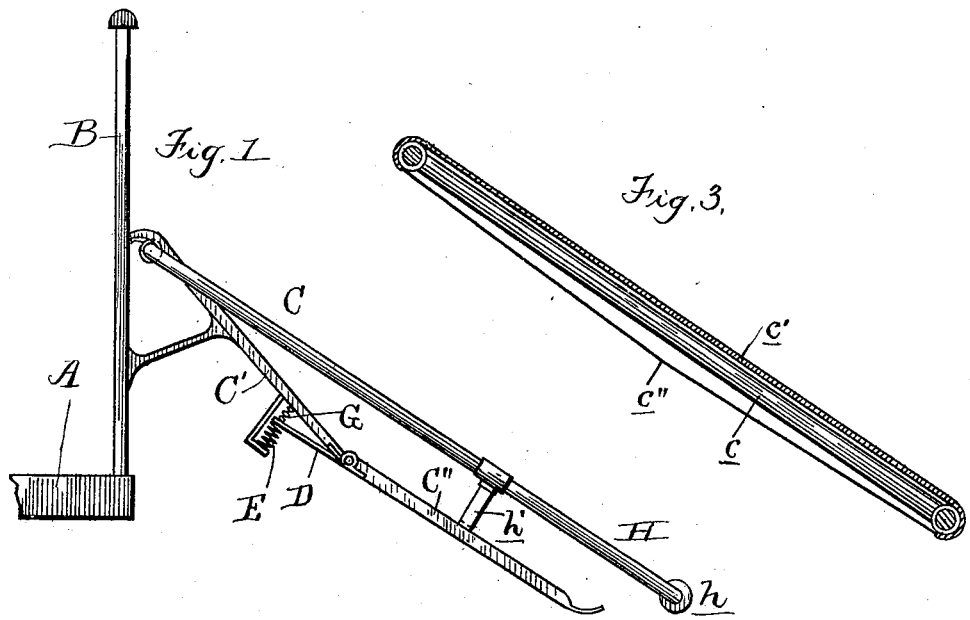
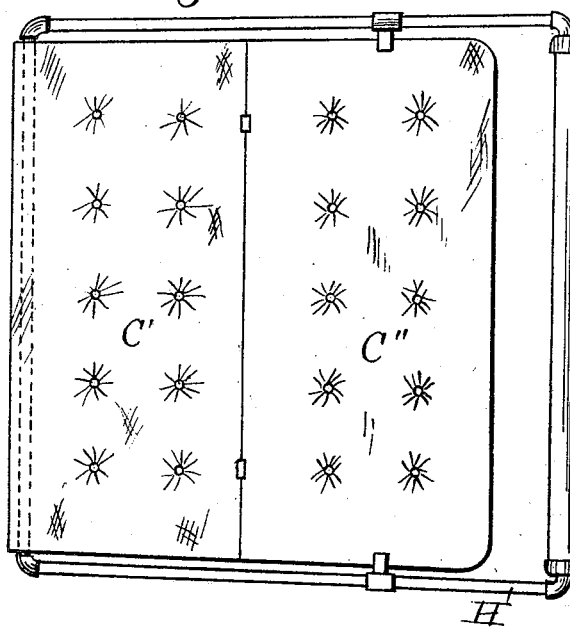
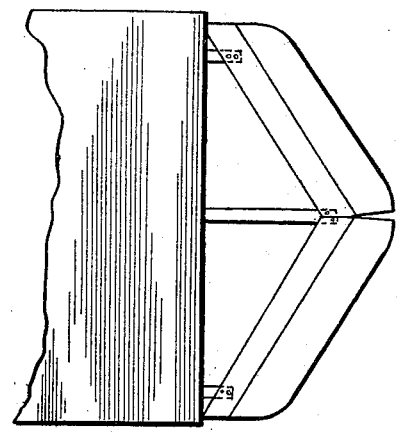
Witnesses
Thos. E. Robertson
W. E. Clendaniel
Inventor
Henri G. Chatain
By T. J. W. Robertson
Attorney

UNITED STATES PATENT OFFICE.

HENRI G. CHATAIN, OF NEW YORK, N. Y.

CAR-FENDER.

SPECIFICATION forming part of Letters Patent No. 522,149, dated June 26, 1894.

Application filed February 23, 1894. Serial No. 501,220. (No model.)

*To all whom it may concern:*

Be it known that I, HENRI G. CHATAIN, a citizen of the United States, residing at New York, in the county of New York and State of New York, have invented certain new and useful Improvements in Car-Fenders, of which the following is a specification, reference being had therein to the accompanying drawings.
This improvement relates to that style of fender which drops down to run under and receive anything that may be in the line of motion of the car to which it is attached, and the invention consists in the peculiar construction, arrangement and combinations of parts hereinafter more particularly described and then definitely claimed.

In the accompanying drawings—Figure 1 is a side view of a fender constructed according to my improvement. Fig. 2 is a plan of the same. Fig. 3 is a section of a modification of the fender, on a larger scale. Fig. 4 is a diagrammatic plan, showing a fender of the ordinary cow-catcher form, on a smaller scale.
Referring now to the details of construction by letter—A represents the front platform of the car, and B the dash-board or front of the same. Near the top of this is set the fender C, consisting of two sections C' and C'', the former being securely and rigidly fastened to the dash-board or front of the car, while the latter (C'') is hinged or pivoted to the lower edge of section C'. I prefer to pad or cushion both of these sections on the upper side thereof, but in some cases this may be omitted, or only one of them padded. The cushion may in some cases be in the form of a rubber air or pneumatic cushion, but the air should not be under sufficient pressure to cause the object falling on it to rebound.

Instead of using solid sections and cushions, the sections may be made of light frames c (see Fig. 3) with rubber or canvas c' stretched over them, which may be strengthened or reinforced by wire netting or ribs c'' at the back.

At the back edge of the section C'' is a projecting arm D, which extends rearward and rests on a spiral spring E, set in a bracket F, attached to the bottom of the section C'. Above the spring is a chain G, whose opposite ends are attached to the arm D and the section C', and the spring and chain are so proportioned that the spring draws down the arm, so as to hold the section C'' in the position indicated in full lines in Fig. 1, while the chain prevents said section from rising beyond the desired height.

At H is indicated a light frame, preferably of iron pipe, which is pivoted at or hinged to the under side of the section C', or it may be hinged to the dash-board or front of the car, and has at its lower end a hollow roller or pipe h, which may be made of a tube of any suitable material but preferably of rubber, and it may be of thick rubber so as to substantially or nearly fit the small pipe running through it, or it may be of thinner rubber and contain compressed air like the pneumatic tire of a bicycle.
At h' are shown hangers, which rest on the upper side of the section C'', and the lower part of the frame or roller h is thus kept at a suitable distance from the roadway by the power of the spring E.

The operation is as follows: Supposing any obstruction to be on the road in the path of the car, such as a man, woman or child, or other object, it would be struck by the pipe or roller h, which would cause said roller h and the frame H to swing on its pivot or hinge and thus carry downward with it the lower end of the section C'', as indicated in dotted lines in Fig. 1, and the obstruction would fall on said section or be picked up by it as the car continued its motion, and thus in case the obstruction consisted of a living being, its life might be saved, as the soft cushion or padding would save it from dangerous injury, whereas if the fender had not been in use it is probable that its life might be lost by being ground under the wheels of the car, or at least a very dangerous injury incurred.

In Fig. 4 I have shown the fender arranged in the form of the ordinary cow-catcher, so that either form may be used at the will of the manufacturer or the company running the cars to which they are to be attached.

From the above it will be seen that I have provided a very convenient arrangement of fender, which is not only comparatively cheaply made and readily attached to any car, but one that will be found very efficacious in saving life and limb.

What I claim as new is—

1. The combination in a car fender, of the sections C' C" hinged together, the arm D, spring E and chain F, substantially as described.

2. The combination with the sections C' C" and spring E, of the frame H, resting on section C" and having its lower end set in advance of the lower end of the section C", substantially as and for the purpose specified.

3. The combination of the section C', having its upper end connected to the front of the car, the section C" pivotally connected to the lower edge of section C', the arm D connected to the section C", the spring E, acting on the arm D, the chain G having its opposite end connected to the section C', and the arm D, with the frame H, having roller $h$ and hangers $h'$, all constructed and arranged substantially as shown and described.

In testimony whereof I affix my signature, in presence of two witnesses, this 21st day of February, 1894.

HENRI G. CHATAIN.

Witnesses:
 JOS. F. ARNOLD,
 J. BURSTOW SMALL.